(12) United States Patent
Bernhard

(10) Patent No.: US 11,016,021 B2
(45) Date of Patent: May 25, 2021

(54) OPTICAL SENSOR WITH COEXTENSIVE SOLID ANGLE LIGHT SOURCE

(71) Applicant: Endress+Hauser Conducta GmbH+Co. KG, Gerlingen (DE)

(72) Inventor: Ralf Bernhard, Stuttgart (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 16/777,976

(22) Filed: Jan. 31, 2020

(65) Prior Publication Data

US 2020/0249147 A1 Aug. 6, 2020

(30) Foreign Application Priority Data

Jan. 31, 2019 (DE) ...................... 10 2019 102 466.8

(51) Int. Cl.
*G01N 21/01* (2006.01)
*G01N 21/59* (2006.01)

(52) U.S. Cl.
CPC ............. *G01N 21/01* (2013.01); *G01N 21/59* (2013.01); *G01N 2201/061* (2013.01)

(58) Field of Classification Search
CPC .. G01N 21/01; G01N 21/59; G01N 2201/061; G01N 21/8803; G01N 21/8806
USPC ......................................................... 356/437
See application file for complete search history.

(56) References Cited

U.S. PATENT DOCUMENTS

| | | | | |
|---|---|---|---|---|
| 4,099,875 A | * | 7/1978 | McMahon | G01S 17/95 356/342 |
| 4,724,313 A | * | 2/1988 | French | G01S 3/786 250/214.1 |
| 2004/0141323 A1 | * | 7/2004 | Aynie | F21S 43/247 362/308 |
| 2015/0316488 A1 | * | 11/2015 | Masumura | G01N 21/8806 356/237.2 |

* cited by examiner

*Primary Examiner* — Roy M Punnoose
(74) *Attorney, Agent, or Firm* — Christopher R. Powers; Endress+Hauser (USA) Holding Inc.

(57) ABSTRACT

The present disclosure discloses an optical sensor for liquid or gas analysis including a light source that emits measurement radiation and a housing, wherein the light source is arranged in the housing, and wherein the light source radiates measurement radiation out of the housing in a solid angle. The optical sensor further includes a signal light source that emits visible light from the housing in at least the same solid angle.

14 Claims, 1 Drawing Sheet

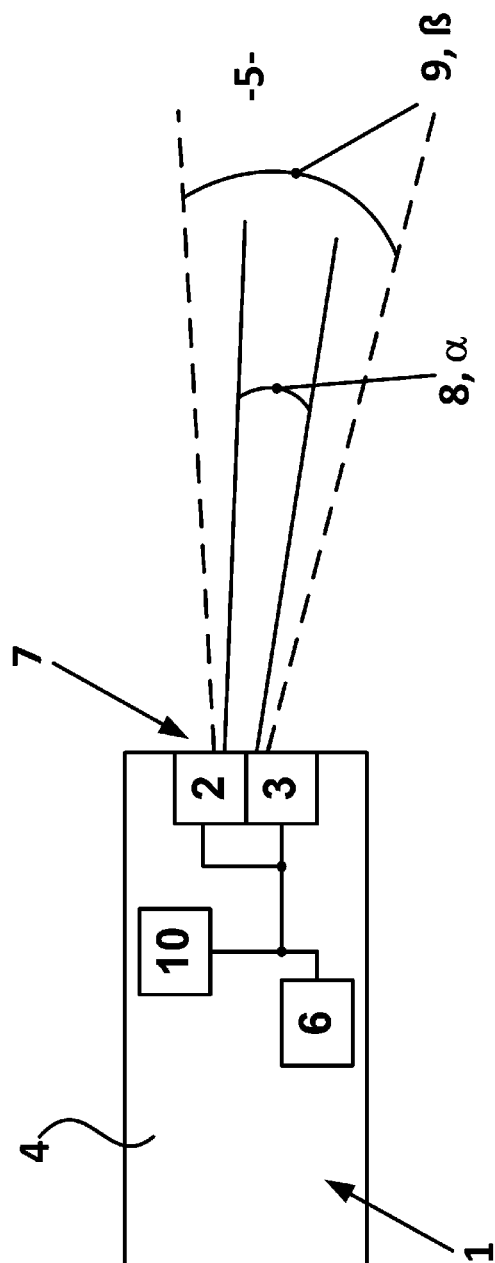

OPTICAL SENSOR WITH COEXTENSIVE SOLID ANGLE LIGHT SOURCE

CROSS-REFERENCE TO RELATED APPLICATION

The present application is related to and claims the priority benefit of German Patent Application No. 10 2019 102 466.8, filed on Jan. 31, 2019, the entire contents of which are incorporated herein by reference.

TECHNICAL FIELD

The present disclosure relates to an optical sensor for liquid or gas analysis.

BACKGROUND

Optical sensors for liquid analysis, for example for measuring fluorescence, turbidity, or absorption, function in part with light intensities which can be dangerous to the unprotected eye. This entails a risk to the user, in particular when the radiation is not visible, for example with ultraviolet light or light in the infrared range. In measuring mode, this risk often does not play a role where sensors are permanently installed. However, in monitoring, maintenance, and cleaning work, as well as in open sensor tests, it is possible to look directly into the radiation. Especially with non-visible radiation, there is the temptation to "take a closer look" in order to see whether the sensor is really functioning.

SUMMARY

The underlying object of the present disclosure is to increase safety for optical sensors with non-visible radiation.

The object is achieved by a sensor comprising: a light source that emits measurement radiation; a housing, wherein the light source is arranged in the housing, and wherein the light source radiates measurement radiation out of the housing in a solid angle. The sensor is an optical sensor comprising a signal light source which emits visible light from the housing in at least the same solid angle such that the solid angles are at least partially coextensive. The signal light source is switched on when the sensor is active and any time a measurement with the switched-on light source can occur. As a result, the user knows when there is a risk that the sensor is emitting hazardous measurement radiation, and a user can be prevented from looking into the light source of the sensor while the sensor is measuring.

At least one embodiment provides that the housing comprises at least one optical window which is transparent at least to the measurement radiation and visible light, and wherein the light source radiates measurement radiation in a solid angle through the optical window, and wherein the signal light source emits the visible light through the optical window at least in the same solid angle.

At least one embodiment provides that in the housing comprises at least two optical windows, and wherein measurement radiation and visible light radiate from the housing through different windows.

At least one embodiment provides that the signal light source blinks or flashes.

At least one embodiment provides that the signal light source emits unfocused light. The light of the (measuring) light source is optionally focused to form a beam. This is not necessary for the signal light source. It is advantageous if the signal light is emitted in a different, i.e., greater, solid angle: Firstly, it is then visible from a larger area, and secondly, a highly focused signal light might have a dangerously high intensity for the eye.

At least one embodiment provides that the signal light source emits colored light, for example, multicolored light.

At least one embodiment provides that the light source is designed as a pulsed light source, wherein the pulsed light source comprises a switched-on phase and a switched-off phase, and wherein the signal light source at least temporarily emits visible light in the switched-off phase of the light source.

At least one embodiment provides that the sensor is designed to determine a measurand of the liquid or gas analysis, wherein the measurand is a measurand in a liquid or gas, wherein the light source is switched on and the signal light is switched off if the sensor is located in the liquid or in the gas; and wherein the light source is switched off and the signal light is switched on if the sensor is located outside of the liquid or outside of the gas.

At least one embodiment provides that the sensor in the housing comprises a position sensor, for example, a yaw rate sensor, movement sensor, or compass, wherein the light source and/or the signal light source is switched on or off depending on the installation position of the optical sensor.

At least one embodiment provides that the signal light source is designed to display information, in particular operating states, by means of the visible light, in particular whether the sensor is switched on or off, a measurement is in progress, measured values are within a certain range, the measurement range is exceeded, the sensor is defective or requires maintenance, in particular by means of different colors, continuous light, different blink frequencies or blink patterns. For example, by flashing the signal light source it is then possible to indicate that a measurement is currently in progress, whereas a continuous light indicates the need for maintenance.

BRIEF DESCRIPTION OF THE DRAWINGS

This will be explained in more detail with reference to the following FIGURE.

FIG. 1 shows an embodiment of an optical sensor according to the present disclosure.

DETAILED DESCRIPTION

The entirety of the claimed sensor is denoted by reference numeral 1 and is shown in FIG. 1.

The sensor 1 comprises a housing 4 and is cuboid or cylindrical in shape, for example. The housing 4 is made of a metal (e.g., stainless steel, titanium, Hastelloy etc.) or a durable plastic.

A first light source 2 and a second light source 3, hereinafter referred to as signal light source, are arranged in the housing 4. The light source 2 transmits measurement radiation 8, for example, in the ultraviolet or infrared range of the spectrum, in the direction of a medium 5 to be measured. The sensor 1 is designed to determine a measurand of a fluid or gas analysis. Parameters to be determined are thereby turbidity, fluorescence, or absorption, as non-limiting examples.

A window 7 is arranged in the housing 4. The housing 4, together with the window 7, is sealed with respect to the medium 5. The window 7 is transparent to the radiation of the light source 2 and to light in the visible range. The light source 2 transmits measurement radiation 8 through the optical window 7 in a solid angle $\alpha$.

The signal light source 3 transmits light 9 from the visible range of the spectrum in the direction of the medium 5. The signal light source 3 transmits in a solid angle β which is at least as great as and at least partially coextensive with the solid angle α of the light source 2.

Light source 2 and signal light source 3 transmit either through the same optical window 7 or through two separate windows. In such an embodiment, the two separate windows comprise the window 7.

The optical sensor 1 also comprises a receiver (not shown). The light emitted by the light source 1 is converted by the medium, for example absorbed, scattered, or fluorescent light is produced. This converted light is detected by the receiver and converted into an electrical signal. The sensor 1 can be designed as a transmission sensor. Optionally, further optical elements, such as one or more mirrors or a prism, are arranged in the housing 4. The receiver can also be arranged at an angle to the light source 2. The window 7 can also be transilluminated by the converted light.

A data processing unit 6 which drives the light sources 2, 3 is arranged in the housing 4. The data processing unit 6 can also process, forward, and output the electrical signal of the receiver.

Various embodiments of the signal light source 3 are contemplated. For example, the signal light source 3 can blink, flash, emit multicolored light, and/or be switched on only when the light source 2 designed as a pulsed light source is off. The signal light source 3 is designed as a light source with one or more LEDs. The visible light is not focused; optionally the light source 3, window 7, or the housing comprises a diffuser.

In instances in which the states of "sensor in the medium 5" and "sensor outside of the medium 5" are meteorologically distinguishable, the measurement radiation 8 can be switched off upon detection of the "sensor outside of the medium 5" state and the signal light source 3 can be switched on. The differentiation takes place by exploiting the difference in refractive index between medium 5 and not-medium 5 (for example air).

It is also possible to detect whether the sensor has left its installation position. This is done by the position sensor 10, which is configured as a yaw rate sensor, movement sensor, or compass. Depending on the position, the measurement radiation 8 is switched off and the signal light source 2 is switched on.

The invention claimed is:

1. An optical sensor for liquid or gas analysis, comprising:
   a measurement light source configured to emit measurement radiation in a first solid angle;
   a signal light source configured to emit visible light in a second solid angle; and
   a housing, wherein the measurement light source and signal light source are disposed within the housing such that the measurement light source radiates measurement radiation from the housing in the first solid angle and such that the signal light source emits visible light from the housing in the second solid angle, and
   wherein the second solid angle is at least coextensive with the first solid angle.

2. The optical sensor of claim 1, further comprising at least one optical window connected to the housing, wherein the window is transparent at least to the measurement radiation and the visible light, wherein the measurement light source emits measurement radiation in the solid angle through the at least one optical window, and wherein the signal light source emits the visible light through the at least one optical window in at least the same first solid angle.

3. The optical sensor of claim 2, wherein the at least one optical window is at least two optical windows connected to the housing, and wherein the measurement radiation and the visible light each radiate from the housing through a different window of the at least two optical windows.

4. The optical sensor of claim 1, wherein the signal light source is configured to blink or flash.

5. The optical sensor of claim 1, wherein the signal light source emits unfocused light.

6. The optical sensor of claim 1, wherein the signal light source emits colored light.

7. The optical sensor of claim 6, wherein the signal light source emits multicolored light.

8. The optical sensor of claim 1, wherein the measurement light source is configured as a pulsed light source having a switched-on phase and a switched-off phase, and wherein the signal light source at least temporarily emits visible light in the switched-off phase of the measurement light source.

9. The optical sensor of claim 1, wherein the optical sensor is configured to determine a measurand of the liquid or gas analysis, wherein the measurand is a measurand in a liquid or a gas,
   wherein the measurement light source is switched on and the signal light source is switched off when the sensor is located in the liquid or in the gas, and
   wherein the measurement light source is switched off and the signal light source is switched on when the sensor is located outside of the liquid or outside of the gas.

10. The optical sensor of claim 1, further comprising a position sensor disposed in the housing, wherein the measurement light source and/or the signal light source is switched on or off depending on an installation position of the optical sensor as detected via position sensor.

11. The optical sensor of claim 10, wherein the position sensor is a yaw rate sensor, movement sensor or compass configured to detect the installation position of the optical sensor.

12. The optical sensor of claim 1, wherein the signal light source is configured to indicate information on an operating state of the optical sensor using the emitted visible light.

13. The optical sensor of claim 12, wherein the operating states include whether the optical sensor is switched on or off, whether a measurement using the optical sensor is in progress, whether measured values are within a predefined range, whether the predefined range is exceeded and/or whether the optical sensor is defective or requires maintenance.

14. The optical sensor of claim 12, wherein the signal light source is configured to indicate the information on the operating state of the optical sensor using different colors of visible light, continuous light, different blink frequencies and/or blink patterns.

* * * * *